(12) United States Patent
Chang

(10) Patent No.: US 8,820,707 B2
(45) Date of Patent: Sep. 2, 2014

(54) VISUAL POSITION INDICATOR FOR A VALVE

(75) Inventor: Chin-Cheng Chang, Taichung (TW)

(73) Assignee: Grand Gas Equipment Incorporation, Taichung (TW)

( * ) Notice: Subject to any disclaimer, the term of this patent is extended or adjusted under 35 U.S.C. 154(b) by 248 days.

(21) Appl. No.: 13/352,386

(22) Filed: Jan. 18, 2012

(65) Prior Publication Data

US 2013/0180608 A1 Jul. 18, 2013

(51) Int. Cl.
*F16K 31/44* (2006.01)

(52) U.S. Cl.
USPC .......................................... 251/265; 251/216

(58) Field of Classification Search
CPC .................... F16K 37/0008; F16K 17/0413
USPC .................. 137/553; 251/216, 264, 265, 330
See application file for complete search history.

(56) References Cited

U.S. PATENT DOCUMENTS

| | | | | | |
|---|---|---|---|---|---|
| 3,601,154 | A | * | 8/1971 | Demler | 137/881 |
| 3,910,308 | A | * | 10/1975 | Mack | 137/553 |
| 4,573,611 | A | * | 3/1986 | O'Connor | 222/147 |
| 6,112,619 | A | * | 9/2000 | Campbell | 74/553 |
| 6,196,523 | B1 | * | 3/2001 | Miyata et al. | 251/276 |
| 6,655,316 | B2 | * | 12/2003 | Kerger et al. | 116/277 |
| 2005/0139268 | A1 | * | 6/2005 | Kremer et al. | 137/553 |
| 2011/0000550 | A1 | * | 1/2011 | Rogier et al. | 137/1 |

* cited by examiner

*Primary Examiner* — John K Fristoe, Jr.
*Assistant Examiner* — Angelisa Hicks
(74) *Attorney, Agent, or Firm* — Alan D. Kamrath; Kamrath IP Lawfirm, P.A.

(57) ABSTRACT

A visual position indicator for a valve includes a knob and inner and outer sleeves. The knob is rotatably mounted on the valve and is attached to a stem operating to open and close the valve. The inner sleeve connected on the valve includes a first colored band and an outer thread portion. The outer sleeve engaged with the knob includes a second colored band and an inner thread portion. The outer and inner thread portions are engaged with each other. The first and second colored bands respectively have a color different to each other. While the valve is closed, the outer sleeve fully conceals the inner sleeve to cause the second colored band to be visible. While the valve is open, the outer sleeve is fully concealed by the knob to cause the first colored band to be visible.

10 Claims, 9 Drawing Sheets

VISUAL POSITION INDICATOR FOR A VALVE

BACKGROUND OF THE INVENTION

1. Field of the Invention

The present invention relates generally to a position indicator for a valve and, more specifically, to a position indicator which visually indicates when the valve is in an open or a closed position.

2. Description of the Related Art

It is often not easy to inspect at a glance to determine whether a valve is open or closed. This problem is of particular concern in consumer goods, such as with valves on propane gas tanks, where harmful gases could escape without notice and potentially cause serious injury, or with valves connecting with diving cylinders, where gas could flow to the scuba diver through the demand valve of a diving regulator without notice before entering the water and instantly cause a life risk. Typically, the known indicating devises are generally not well suited for use in valve-containing consumer goods because these indicating devises are integrated with the valve assembly which increase the possibility of malfunction and also increase the manufacturing cost.

The present invention is, therefore, intended to obviate or at least alleviate the problems encountered in the prior art.

SUMMARY OF THE INVENTION

According to the present invention, a visual position indicator for a valve includes a knob and inner and outer sleeves. The knob is rotatably mounted on the valve and attached to a stem operating to open and close the valve. The inner sleeve is connected on the valve and includes a first colored band and an outer thread portion. The outer sleeve is engaged with the knob and includes a second colored band and an inner thread portion. The outer and inner thread portions are engaged with each other, so that the outer sleeve is movable with respect to the inner sleeve. The first and second colored bands respectively have a color different to each other. While the valve is closed, the outer sleeve fully conceals the inner sleeve to cause the second colored band to be visible. While the valve is open, the outer sleeve is fully concealed by the knob to cause the first colored band to be visible.

In a preferred embodiment, the visual position indicator of the present invention is utilized in a valve connecting with a diving cylinder.

It is an object of the present invention to provide a visual position indicator that visually indicates when the valve is in an open or a closed position.

It is another object of the present invention to provide an indicator advantageously suited for use in consumer goods containing valves.

It is an additional object of the present invention to enhance the safety of a valve by providing a visual indication of the valve open position.

BRIEF DESCRIPTION OF THE DRAWINGS

For the present disclosure to be easily understood and readily practiced, the present disclosure will now be described for the purpose of illustration not limitation, in conjunction with the following figures, wherein.

Figure 1:
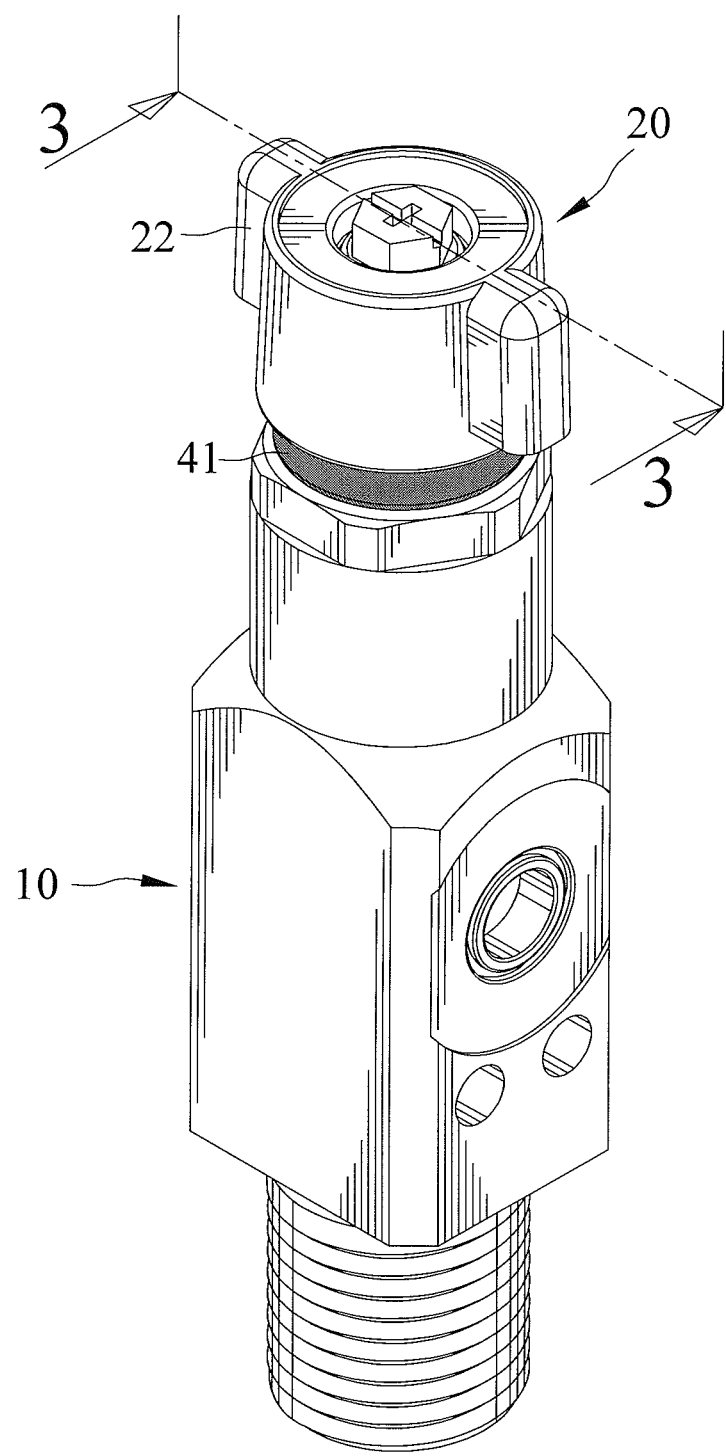
FIG. 1 is a perspective view of a visual position indicator for a valve and shows that the valve is closed in accordance with a first embodiment of the present invention.
Figure 2:
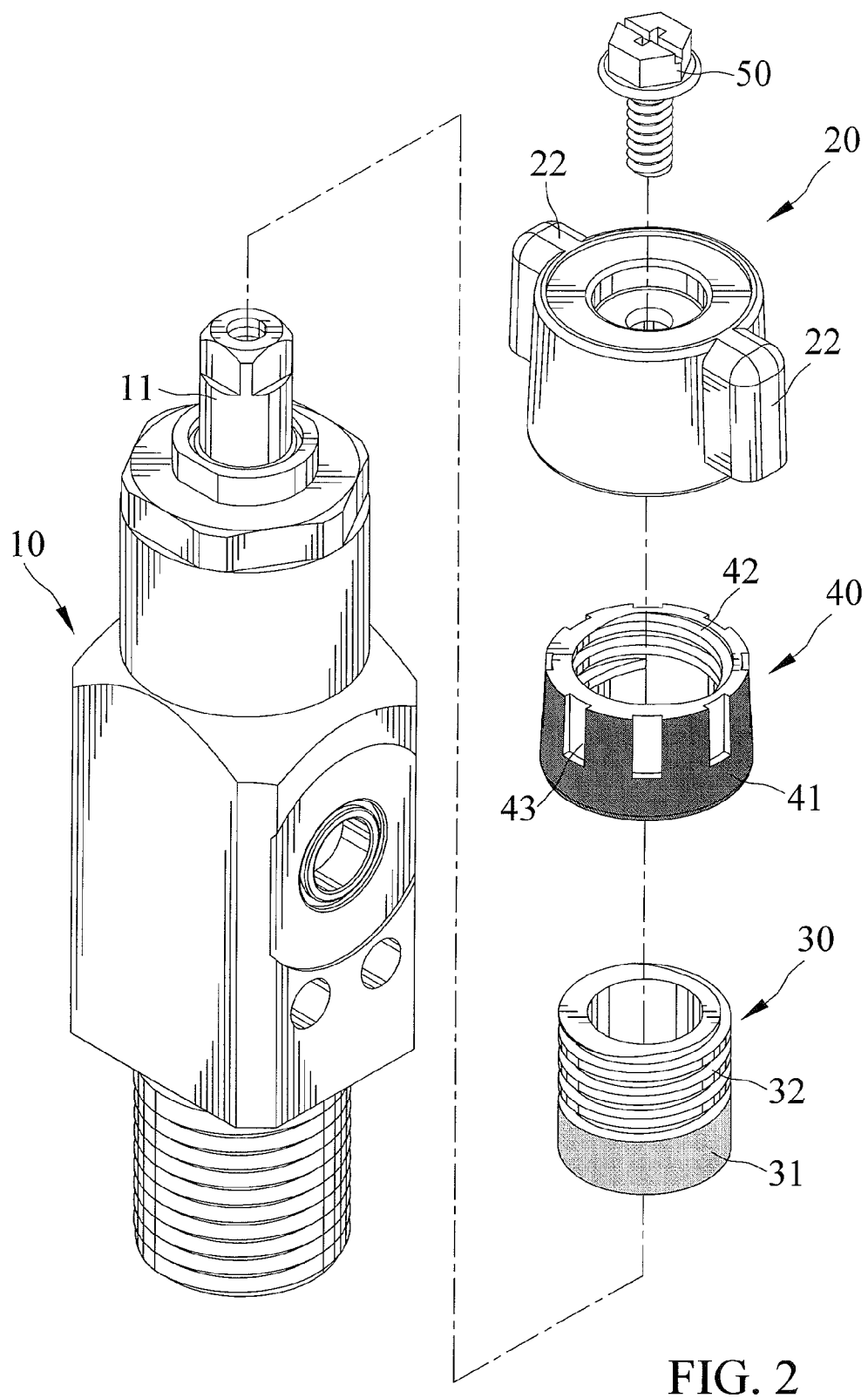
FIG. 2 is an exploded perspective view of the visual position indicator for the valve of FIG. 1.

All figures are drawn for ease of explanation of the basic teachings of the present invention only; the extensions of the figures with respect to number, position, relationship, and dimensions of the parts to form the preferred embodiments will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "first", "second", "third", "inner", "outer", "side", "end", "portion", "section", "longitudinal", "clockwise", "counterclockwise", and similar terms are used herein, it should be understood that these terms have reference only to the structure shown in the drawings as it would appear to a person viewing the drawings and are utilized only to facilitate describing the invention.

DETAILED DESCRIPTION OF THE PREFERRED EMBODIMENTS

Figure 3:
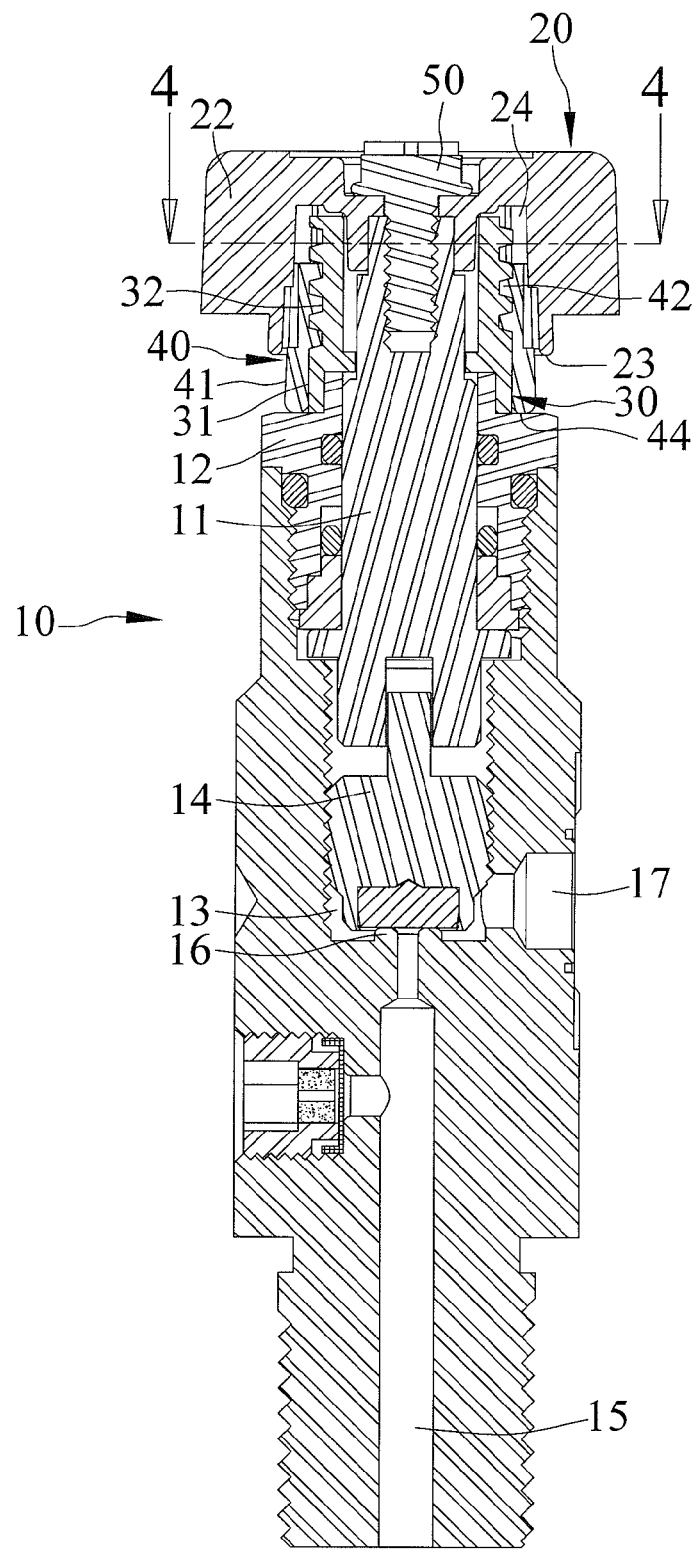
FIG. 3 is a cross-sectional view taken along line 3-3 of FIG. 1.
Figure 4:
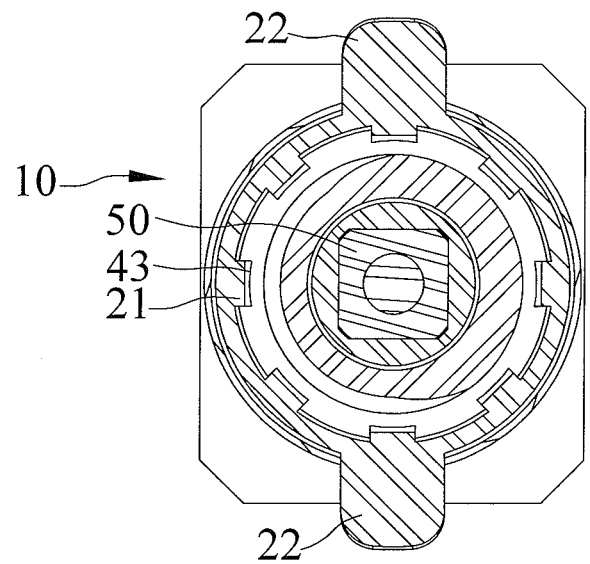
FIG. 4 is a cross-sectional view taken along line 4-4 of FIG. 3.
Figure 5:
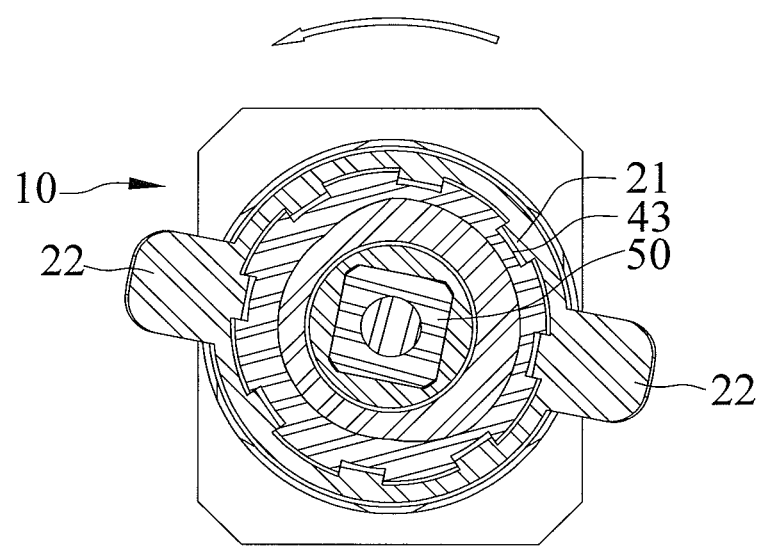
FIG. 5 is a continued cross-section view of FIG. 4 and shows a knob rotating with respect to the valve.
Figure 6:
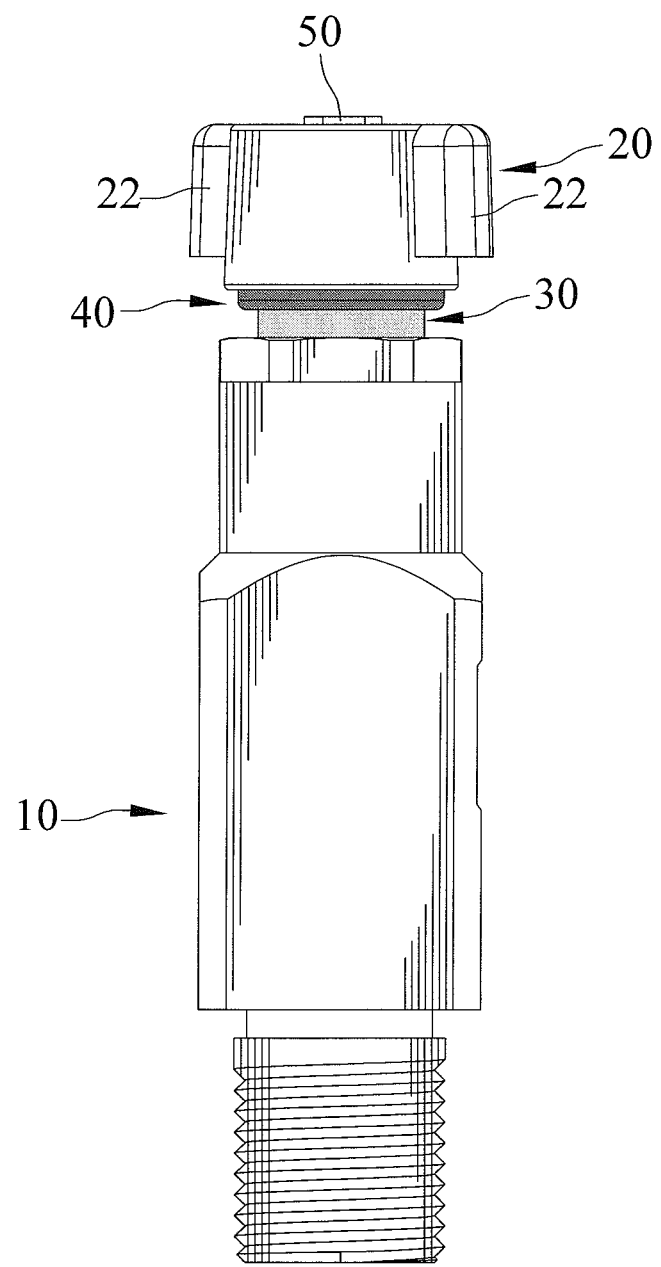
FIG. 6 is a side view of the visual position indicator for the valve and shows that the valve is disposed between closed and open positions in accordance with a first embodiment of the present invention.
Figure 7:
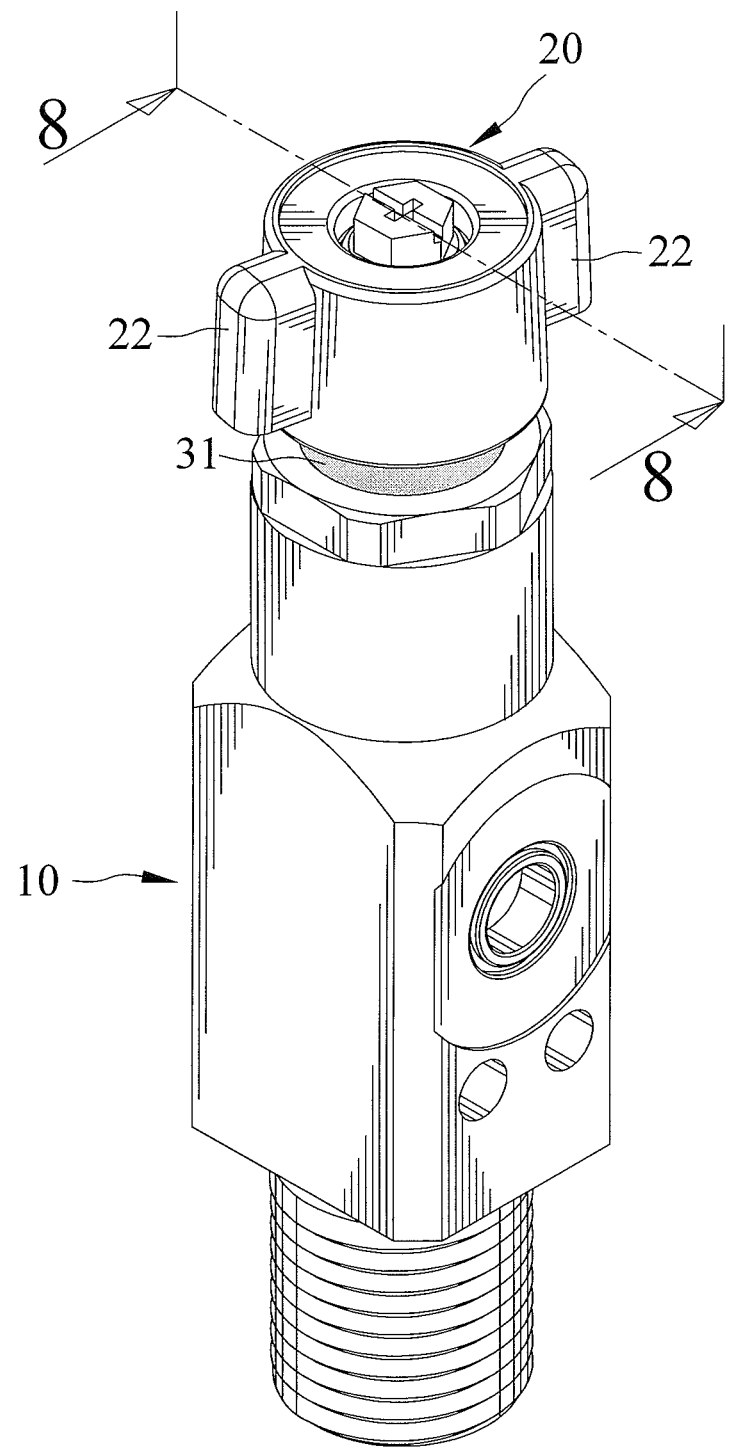
FIG. 7 is a perspective view of a visual position indicator for a valve and shows that the valve is open in accordance with the first embodiment of the present invention.
Figure 8:
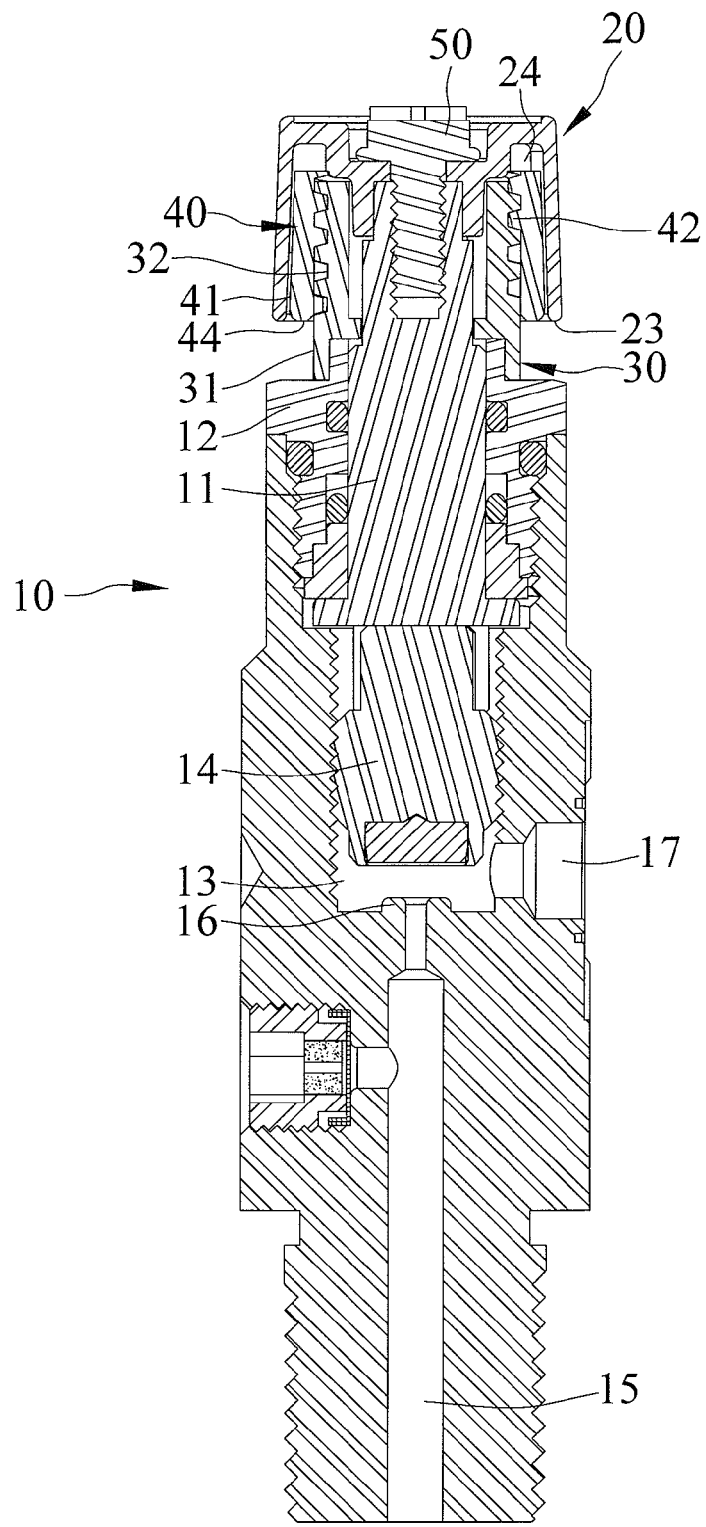
FIG. 8 is a cross-sectional view taken along line 8-8 of FIG. 7.

Referring to FIGS. 1 through 8, a visual position indicator for a valve 10 in accordance with a first embodiment of the present invention includes a knob 20, an inner sleeve 30, and an outer sleeve 40. The inner and outer sleeves 30 and 40 are comprised of plastic, respectively. In this embodiment, an axis extended through the valve 10 and an axis extended through the knob 20 are coaxial. The valve 10 includes a stem 11 attached to the knob 20 by a fastener 50, a shoulder 12, a chamber 13, a valve closure 14, an inlet 15, a valve seat 16, and an outlet 17. The stem 11 and the valve closure 14 are received in the chamber 13. The inlet 15 provides fluid flow into the chamber 13. The valve seat 16 is formed on the inlet 15. The chamber 13, the inlet 15, and the outlet 17 are selectively connected with each other. Rotating the knob 20 causes rotation of the stem 11 and movement of the valve closure 14 between a position abutting against the valve seat 16 to close the valve 10 as shown in FIG. 3, and a position in which the valve closure 14 is spaced from the valve seat 16 to cause the chamber 13, the inlet 15, and the outlet 17 connected with each other to from a path, which provides fluid flowing form the inlet 15 to the outlet 17.

The knob 20 is rotatably mounted on the valve 10 and is attached to the stem 11 operating to open and close the valve. The knob 20 includes a plurality of lugs 21, two flanges 22, a first distal surface 23, and a groove 24. The plurality of lugs 21 radially extends oppositely from an inner periphery of the knob 20 to a radial extent. The two flanges 22 radially extend oppositely from an outer periphery of the knob 20 to a radial extent to provide increasing lever arms for a user to effectively rotate the knob 20. The groove 24 is formed in the inner periphery of the knob 20 and selectively receives the outer sleeve 40.

The inner sleeve 30 is connected on the valve 10. The inner sleeve 30 includes a first colored band 31 and an outer thread portion 32 both formed on an outer periphery thereof. In this embodiment, the first colored band 31 is colored green.

The outer sleeve 40 includes a second colored band 41 formed on an outer periphery thereof, an inner thread portion 42 formed in an inner periphery thereof, a plurality of recesses 43 radially retracting oppositely from the outer periphery thereof to a radial extent, and a second distal surface 44 formed on the second colored band 41. In this embodiment, the second colored band 41 is colored red. The plurality of lugs 21 is respectively engaged with the plurality of recesses 43 to result in the outer sleeve 40 able to be actuated by rotating the knob 20 to move axially with respect to the stem 11. The outer thread portion 32 of the inner sleeve 30 is engaged with the inner thread portion 42 of the outer sleeve 40 to result in the outer sleeve 40 being movable with respect to the inner sleeve 30.

When the valve 10 is closed, the shoulder 12 of the valve 10 is abutted against the second distal surface 44 of the outer sleeve 40, so that the outer sleeve 40 fully conceals the inner sleeve 30 to cause the second colored band 41 to be visible and the first colored band 31 to be invisible to result in the user only seeing red colored on the second colored band 41.

When the valve 10 is open, the outer sleeve 40 moves respect to the stem 11 and the inner sleeve 30 to cause the outer sleeve 40 to be received in the groove 24 and the first distal surface 23 of the knob 20 and the second distal surface 44 of the outer sleeve 40 are arranged on a same plane. Thus, the outer sleeve 40 is fully concealed by the groove 24 of the knob 20 to cause the first colored band 31 to be visible and the second colored band 41 to be invisible to result in the user only seeing green colored on the first colored band 31.

Figure 9:
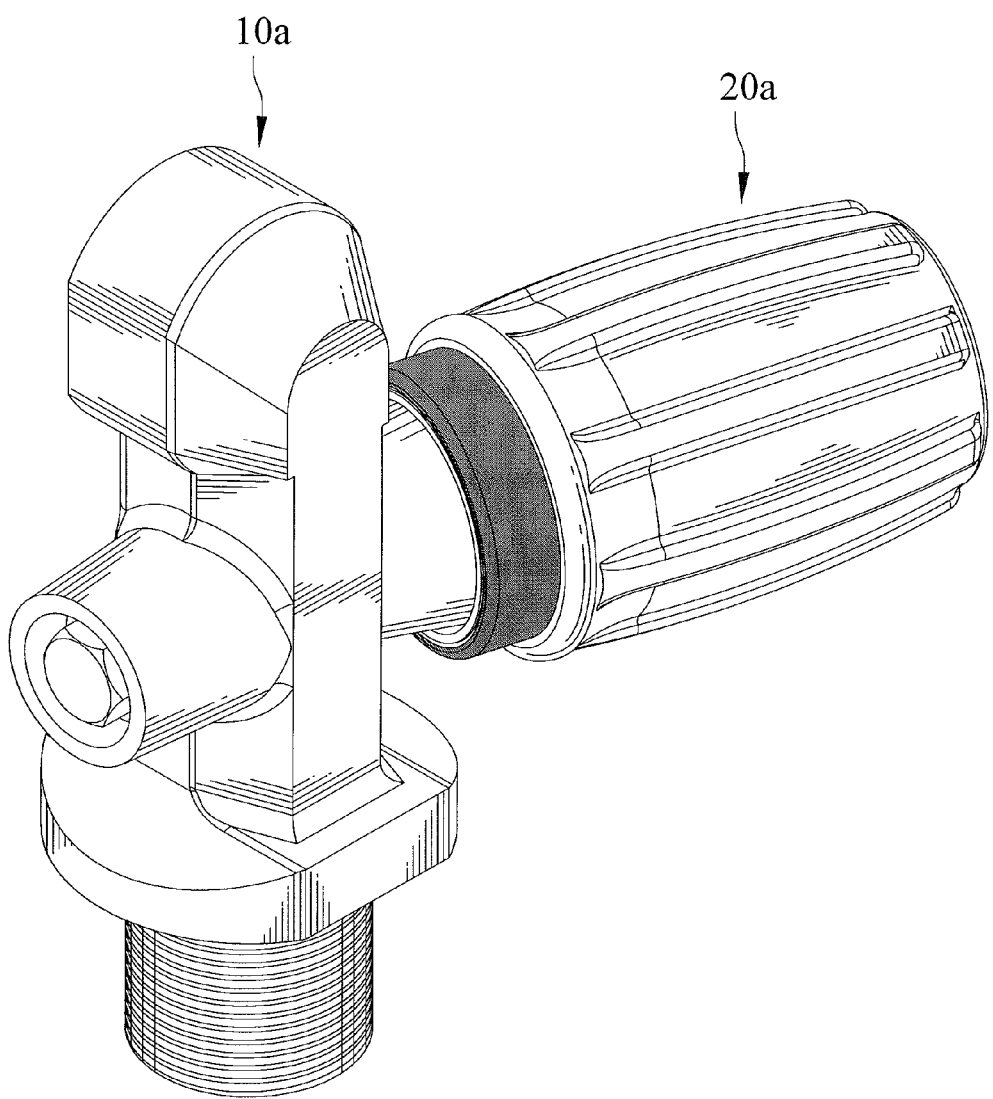
FIG. 9 is a perspective view of a visual position indicator for a valve and shows that the valve is closed in accordance with a second embodiment of the present invention.
Figure 10:
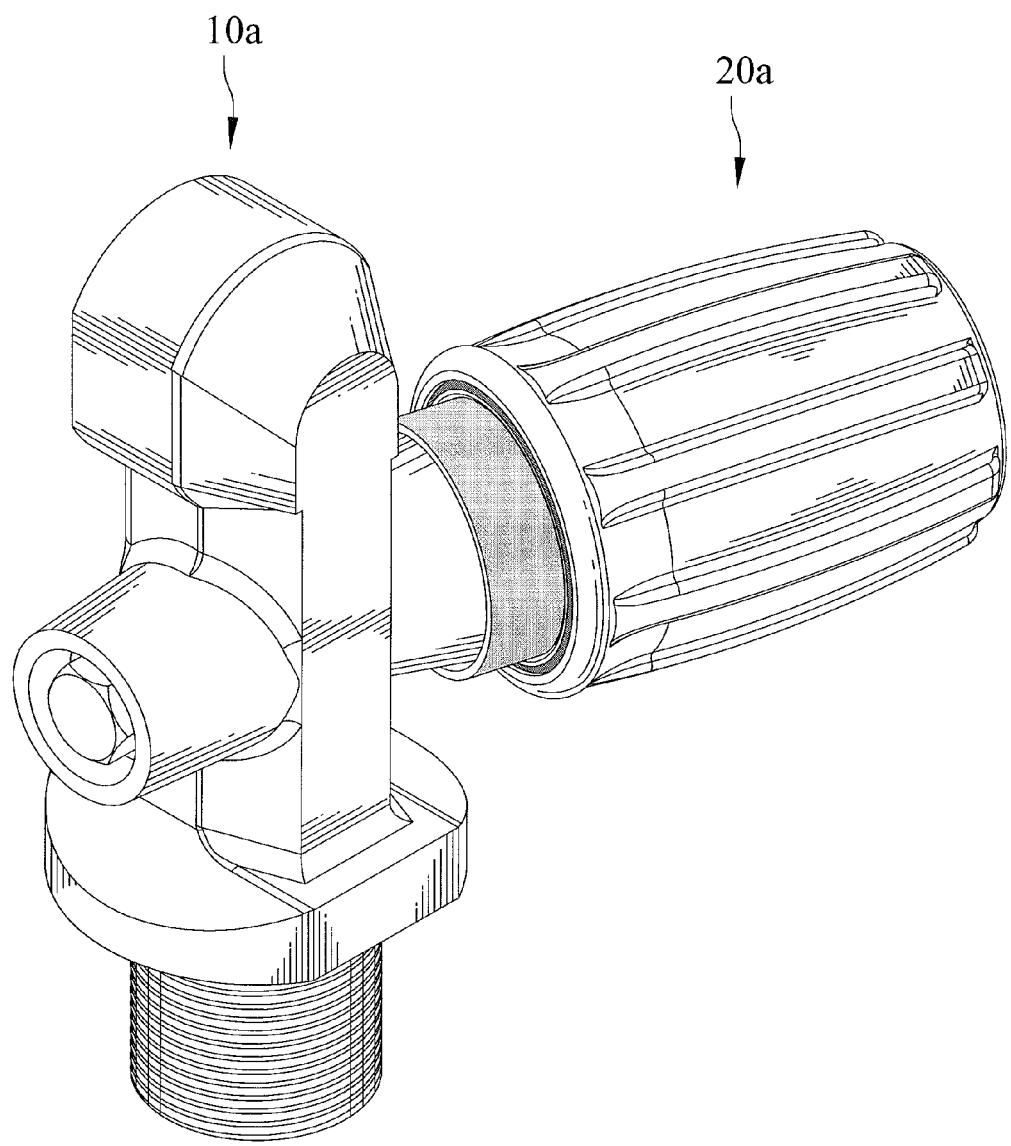
FIG. 10 is a perspective view of a visual position indicator for a valve and shows that the valve is open in accordance with the second embodiment of the present invention.

Referring to FIGS. 9 and 10, there is shown a visual position indicator for a valve 10a according to a second embodiment of the present invention. The structure of the second embodiment is similar to the first embodiment substantially except that an axis extended through a valve 10a and an axis extended through the knob 20a cross each other. Hence, the visual position indicator can be used for many different types of valves.

As demonstrated by the detailed description of the preferred embodiments, the improved arrangement of the present invention allows the user of the valve to readily determine whether the valve is open or closed. The simplistic construction achieves long-term performance of the indicator at a nominal cost of production.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. A visual position indicator for a valve, comprising:
    a knob rotatably mounted on the valve, wherein the knob is attached to a stem operating to open and close the valve, wherein the valve has a shoulder formed therein, wherein the knob includes a first distal surface disposed therein;
    an inner sleeve connected on the valve, wherein the inner sleeve includes a first colored band and an outer thread portion formed on an outer periphery thereof; and
    an outer sleeve engaged with the knob, wherein the outer sleeve includes a second colored band and an inner thread portion respectively formed on an outer periphery and an inner periphery thereof, wherein the outer sleeve includes a second distal surface formed on the second colored band;
    wherein the outer and inner thread portions are engaged with each other, with the outer sleeve movable with respect to the inner sleeve, wherein the first and second colored bands respectively have a color different to each other;
    wherein while the valve is closed, the shoulder is abutted against the second distal surface, and the outer sleeve fully conceals the inner sleeve to cause the second colored band to be visible and the first colored band invisible; and
    wherein while the valve is open, the first and second distal surfaces are arranged on a same plane, and the outer sleeve moves respect to the stem and the inner sleeve, with the outer sleeve fully concealed by the knob to cause the first colored band to be visible and the second colored band to be invisible.

2. The visual position indicator for a valve as claimed in claim 1, wherein the knob includes a plurality of lugs radially extending oppositely from an inner periphery thereof to a radial extent, wherein the outer sleeve includes a plurality of recesses radially retracting oppositely from the outer periphery thereof to a radial extent, wherein the plurality of lugs is respectively engaged with the plurality of recesses to result in the outer sleeve being able to be actuated by the knob to move axially with respect to the stem.

3. The visual position indicator for a valve as claimed in claim 1, wherein the knob includes two flanges radially extending oppositely from an outer periphery thereof to a radial extent to provide increasing lever arms for a user to effectively rotate the knob.

4. The visual position indicator for a valve as claimed in claim 1, wherein the knob includes a groove formed in an inner periphery thereof, with the groove selectively receiving the outer sleeve.

5. The visual position indicator for a valve as claimed in claim 1, wherein the valve includes a chamber, a valve closure carried at an end of the stem, an inlet, a valve seat formed on the inlet, and an outlet, with the stem and the valve closure received in the chamber, with the chamber, the inlet, and the outlet selectively connecting with each other;
    wherein while the valve is closed, the valve seat is abutted against the valve closure to cause the valve closure to be disposed between the inlet and the outlet; and
    wherein while the valve is open, the valve closure is spaced from the valve seat to cause the chamber, the inlet, and the outlet connected with each other to form a path.

6. The visual position indicator for a valve as claimed in claim 1, wherein the inner and outer sleeves are comprised of plastic, respectively.

7. The visual position indicator for a valve as claimed in claim 1, wherein the first colored band is colored green, and the second colored band is colored red for a visually contrasting indication.

8. The visual position indicator for a valve as claimed in claim 1, wherein an axis extended through the valve and an axis extended through the knob are coaxial.

9. The visual position indicator for a valve as claimed in claim 1, wherein an axis extended through the valve and an axis extended through the knob cross each other.

10. The visual position indicator for a valve as claimed in claim 1, wherein the knob is mounted on the valve by a fastener.

\* \* \* \* \*